(12) United States Patent
Shen Ku

(10) Patent No.: US 7,997,186 B2
(45) Date of Patent: Aug. 16, 2011

(54) COVER FOR BEVERAGE MAKER ASSEMBLY

(76) Inventor: Chun-Lan Shen Ku, Puli Township, Nantou County (TW)

(*) Notice: Subject to any disclaimer, the term of this patent is extended or adjusted under 35 U.S.C. 154(b) by 0 days.

(21) Appl. No.: 12/149,687

(22) Filed: May 6, 2008

(65) Prior Publication Data

US 2010/0242740 A1 Sep. 30, 2010

(51) Int. Cl.
*A47J 31/10* (2006.01)
*A47J 31/02* (2006.01)

(52) U.S. Cl. .............. 99/299; 99/306; 99/317; 99/323

(58) Field of Classification Search .............. 99/299, 99/322; 222/475.1; 220/244, 263, 810, 811, 220/710.5, 711, 715, 752, 755, 756; 215/239, 215/241, 235, 236

See application file for complete search history.

(56) References Cited

U.S. PATENT DOCUMENTS

| | | | | |
|---|---|---|---|---|
| 3,784,059 A | * | 1/1974 | Katzakian | ........................ 222/86 |
| 4,026,274 A | * | 5/1977 | Gutierrez | .................... 126/390.1 |
| 5,855,160 A | | 1/1999 | Shen | ................................ 99/279 |
| 6,343,542 B1 | * | 2/2002 | Shen | ................................ 99/299 |
| 7,225,952 B2 | * | 6/2007 | Naden | ........................ 222/465.1 |

* cited by examiner

*Primary Examiner* — Reginald L Alexander
(74) *Attorney, Agent, or Firm* — Wang Law Firm, Inc.; Li K. Wang

(57) ABSTRACT

A beverage maker assembly includes an outer cup and an inner cup which is removably received in the outer cup. A filtering unit is received in the inner cup and communicates with a drain hole defined in a bottom of the inner cup so that the beverage can flow to the outer cup. A cover is pivotably connected to a handle of the outer cup and has an operation portion extending radially from a periphery thereof. A pivotal portion extends from the operation portion and has an elongate hole. The pivotal portion is movably engaged with a recess defined in the handle by extending a pin through the handle and the elongate hole to pivotably connect the cover to the handle. The cover is easily opened and closed relative to the outer cup.

3 Claims, 7 Drawing Sheets

COVER FOR BEVERAGE MAKER ASSEMBLY

FIELD OF THE INVENTION

The present invention relates to a cover for a beverage maker assembly which includes an outer cup and an inner cup, and the cover is pivotably connected to the outer cup and easily operated.

BACKGROUND OF THE INVENTION

A conventional beverage maker assembly such as a tea maker is disclosed in U.S. Pat. No. 5,855,160 which discloses a cover pivotably connected to a handle of the tea maker and when the user presses the press portion on the cover, the cover is pivoted to open or to close the tea maker. However, the distance between the press portion and the user's finger is too long which makes the operation inconvenient.

The present invention intends to provide a cover for a beverage maker assembly which improves the shortcomings of the existed cover of beverage maker assembly.

SUMMARY OF THE INVENTION

The present invention relates to a beverage maker assembly which comprises an outer cup with a handle on outside thereof and an inner cup is removably received in the outer cup. A cover is pivotably connected to the handle and can close to the outer cup. The handle includes a recess which defines two lugs and a passage is defined through the two lugs. The cover has an operation portion extending radially from a periphery thereof and a pivotal portion extends from the operation portion. The pivotal portion has an elongate hole. The pivotal portion is received in the recess and a pin extends through the passage and the elongate hole to pivotably connect the cover to the handle. A filtering unit is received in the inner cup and communicates with a drain hole defined in a bottom of the inner cup so that the beverage can flow into the outer cup via the drain hole.

The primary object of the present invention is to provide a cover for a beverage maker assembly and the cover is easily opened and closed by the finger of the hand holding the handle of the beverage maker assembly.

Another object of the present invention is to provide a cover for a beverage maker assembly wherein the cover is guided by moving bosses on the cover along curved grooves in the handle so that the cover can be operated smooth and stable.

Yet another object of the present invention is to provide a cover for a beverage maker assembly wherein the cover includes a guide protrusion which ensures that the cover can successfully cover the beverage maker assembly.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
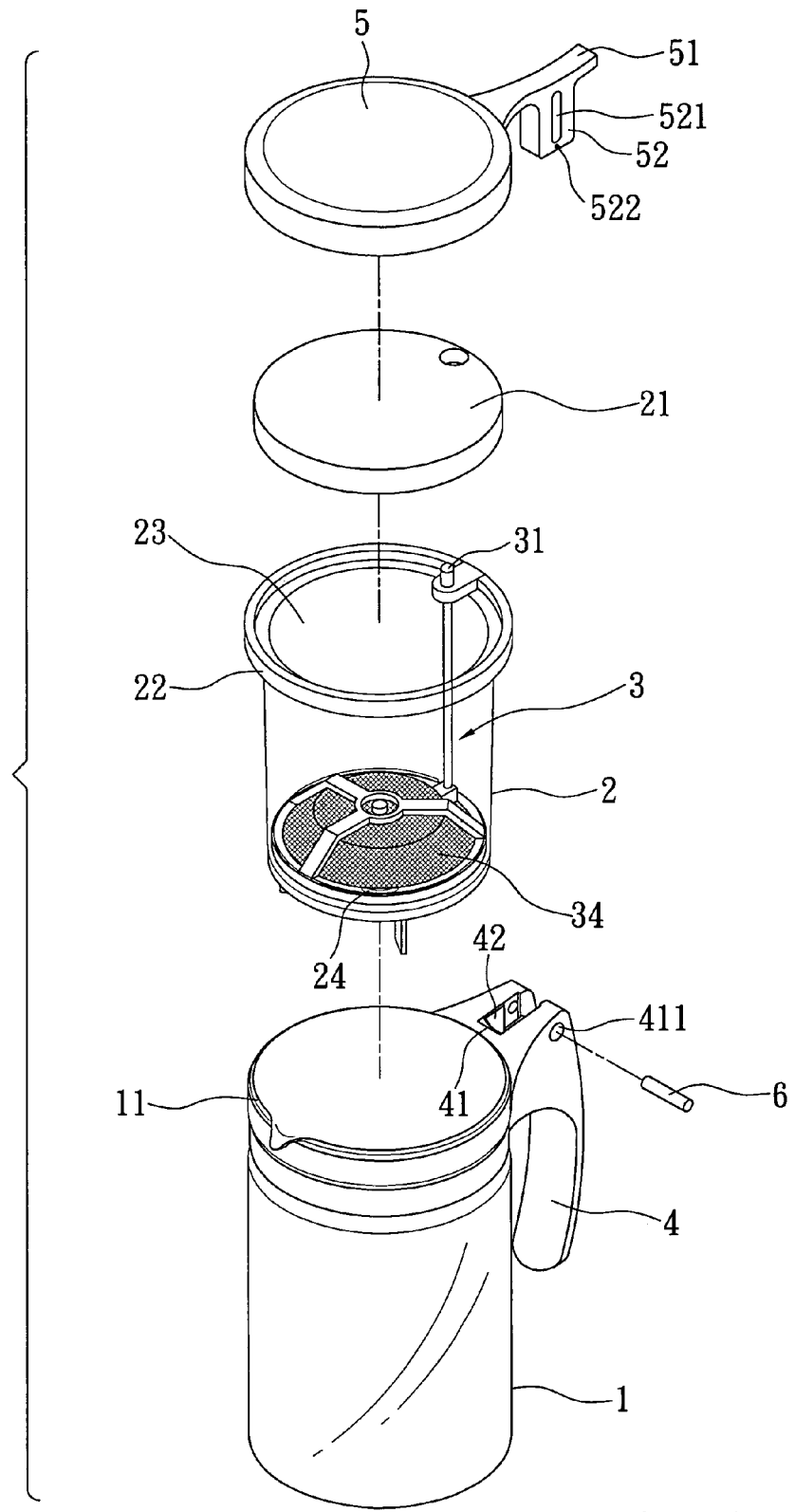
FIG. 1 is an exploded view to show the beverage maker assembly of the present invention.

Referring to FIG. 1, the beverage maker assembly of the present invention comprises an outer cup 1 which has a top open end 11 and a handle 4 is connected to an outside thereof. A first cover 5 is pivotably connected to the handle 4. An inner cup 2 has a space 23 defined therein and is removably received in the outer cup 1. The inner cup 2 has a flange 22 extending outward from an open top end thereof and the flange 22 is rested on the periphery of the top open end 11 when the inner cup 2 is received in the outer cup 1. A second cover 21 can be mounted to the top open end of the inner cup 2.

Figure 6:
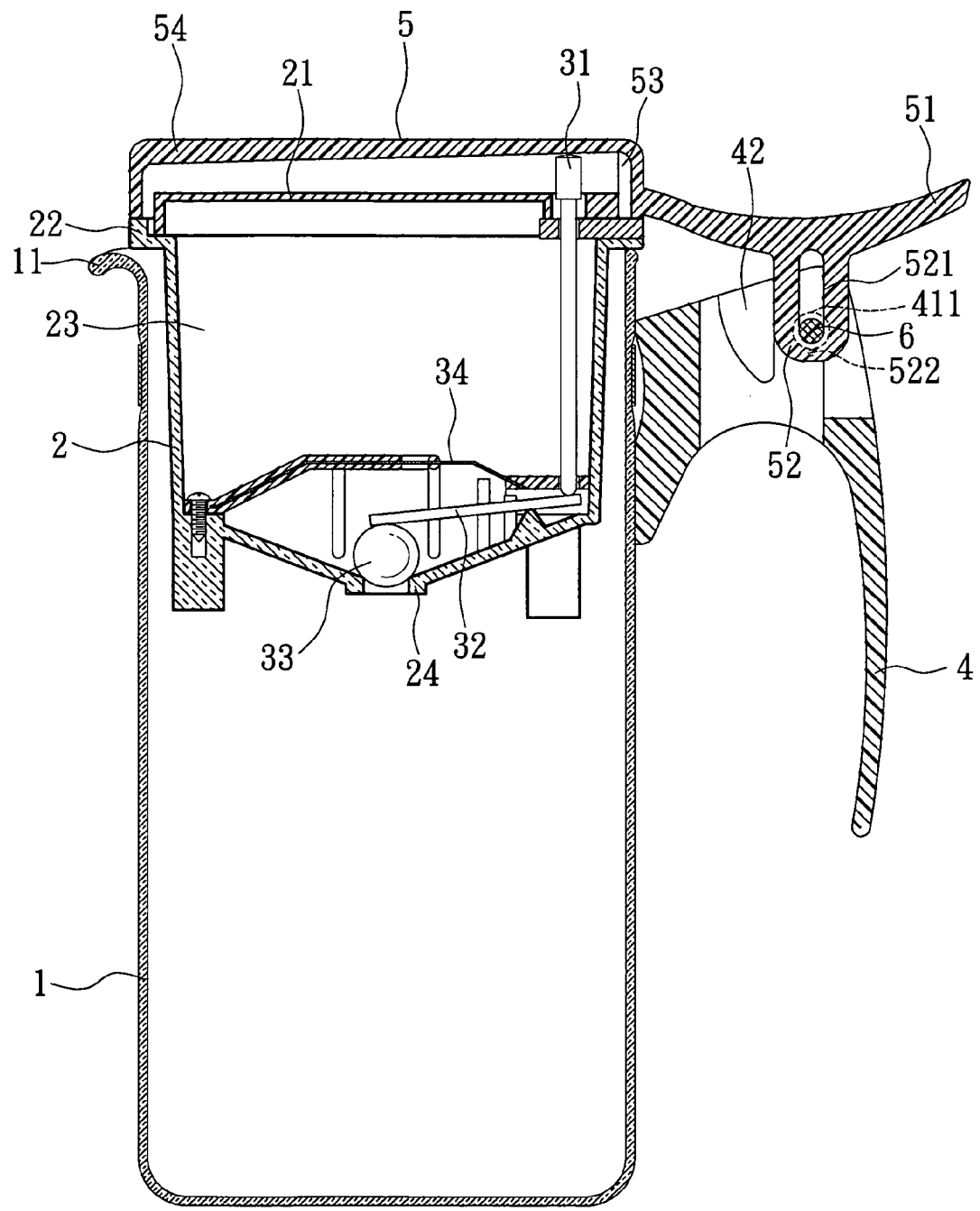
FIG. 6 is a cross sectional view to show that the first cover is at closed position while the inner cup is received in the outer cup.

Further referring to FIG. 6, a filtering unit 3 is located in the inner cup 2 and includes a push rod 31 which is movably positioned along the inside wall of the inner cup 2 and a first end of the push rod 31 protrudes above the top open end of the inner cup 2 such that the user can push the first end of the push rod 31 downward. A second end of the push rod 31 is in contact with a first end of a link 32 and a second end of the link 32 is connected with a seal ball 33 to seal or open the drain hole 24. A filtering net 34 is located above the link 32 to filter the beverage in the inner cup 2. By pushing the first end of the push rod 31, the first end of the link 32 is pushed downward, and the second end of the link 32 lifts the seal ball 23 to open the drain hole 24.

Figure 3:
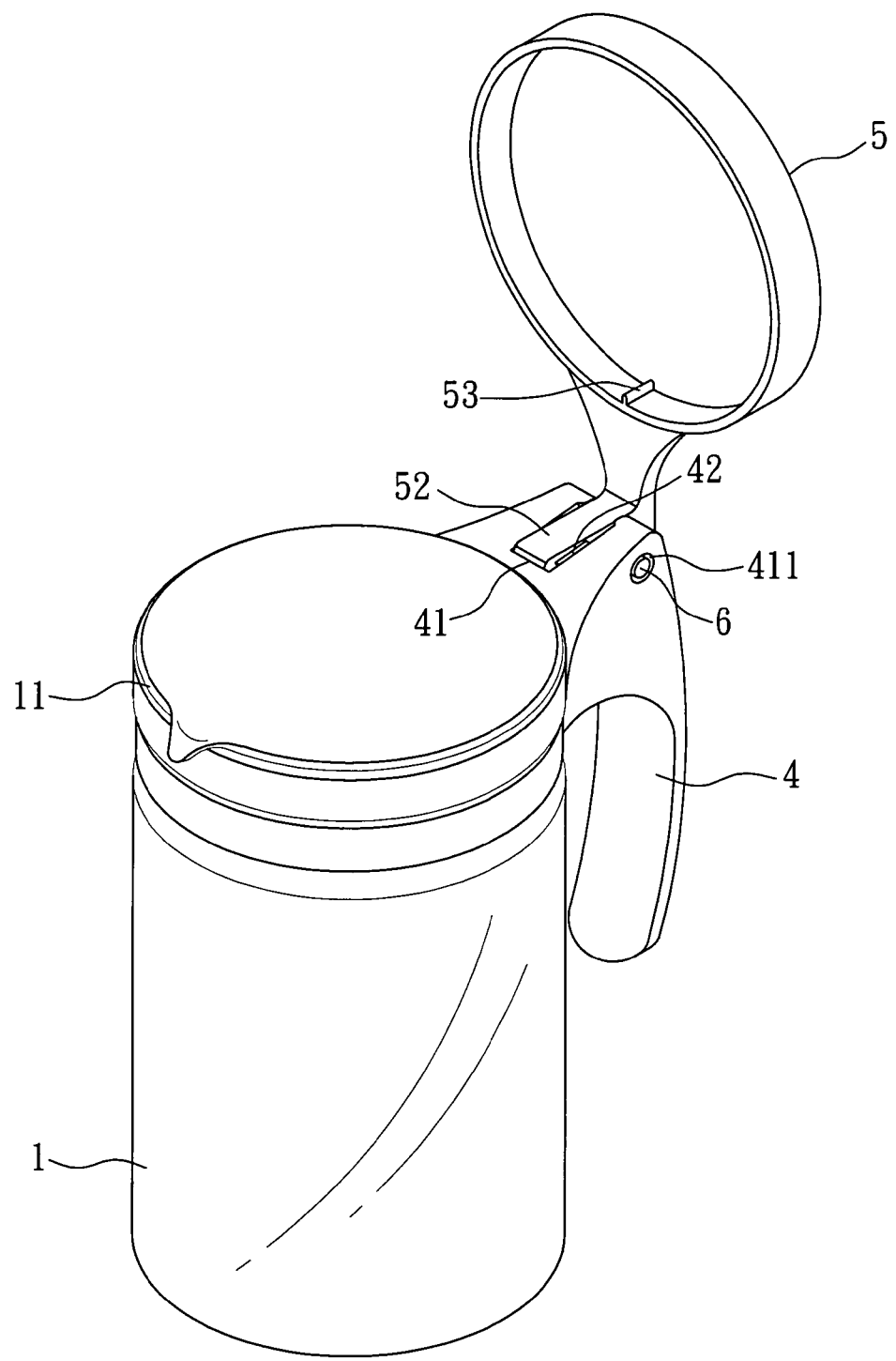
FIG. 3 is a perspective view to show the outer cup with the first cover being opened.
Figure 4:
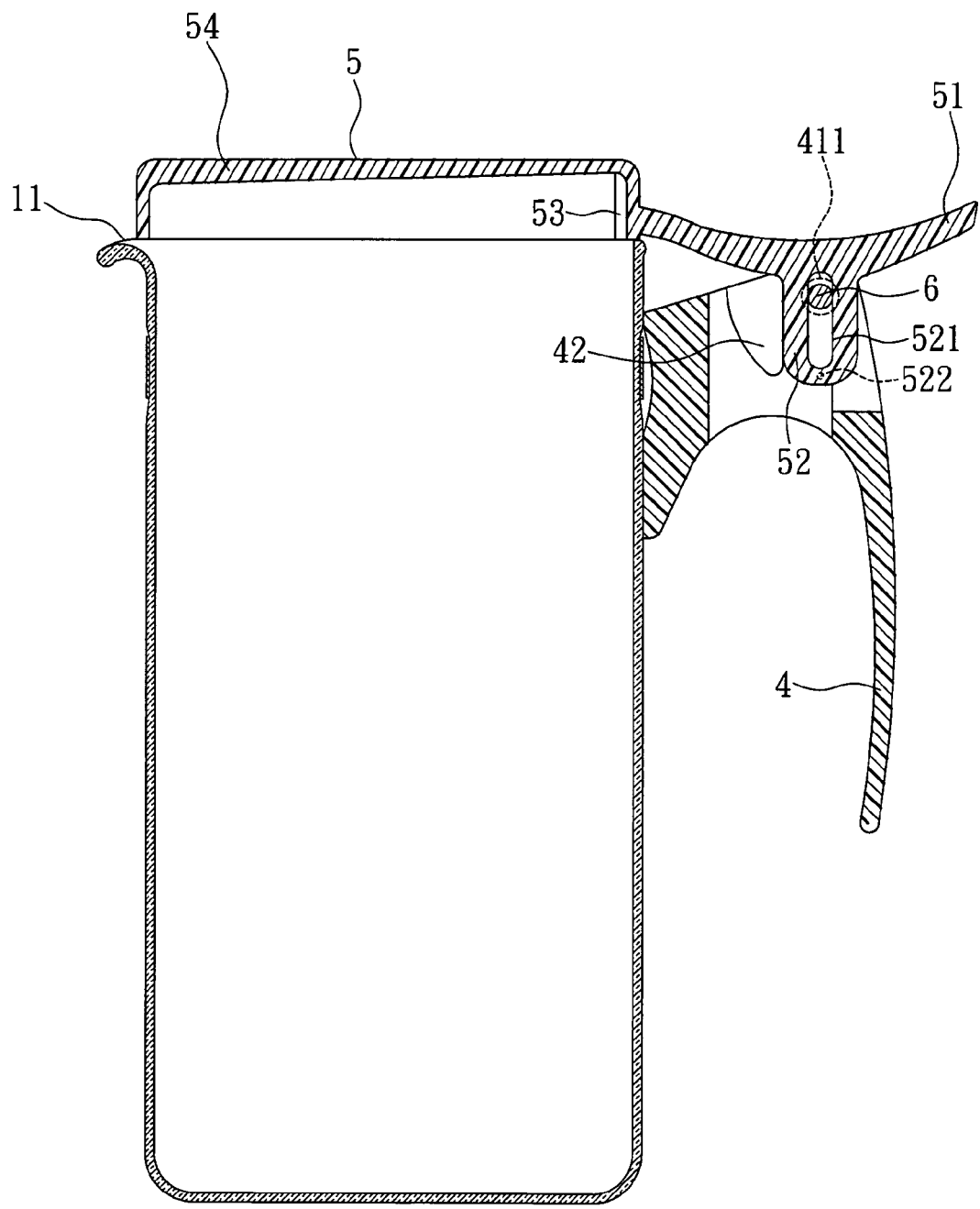
FIG. 4 is a cross sectional view to show that the first cover on the outer cup is at closed position.

Further referring to FIGS. 3 and 4, the handle 4 includes a recess 41 which defines two lugs and a passage 411 is defined through the two lugs between which the recess 41 is defined. The first cover 5 has an operation portion 51 extending radially from a periphery thereof and a pivotal portion 52 extends substantially perpendicularly from the operation portion 51. The pivotal portion 51 has an elongate hole 521 and is received in the recess 41, a pin 6 extends through the passage 411 and the elongate hole 521 to pivotably connect the first cover 5 to the handle 4. Two curved grooves 42 are defined in two respective insides of the two lugs of the handle 4 and the first cover 5 includes two bosses 522 extending from the pivotal portion 52. The bosses 522 are slidably engaged with the curved grooves 42. The first cover 5 has a guide protrusion 53 located at an inside of a peripheral wall thereof and the guide protrusion 53 is located close to the pivotal portion 52. A thicken portion 54 located at a position of the first cover 5 and opposite to the guide protrusion 53.

Figure 2:
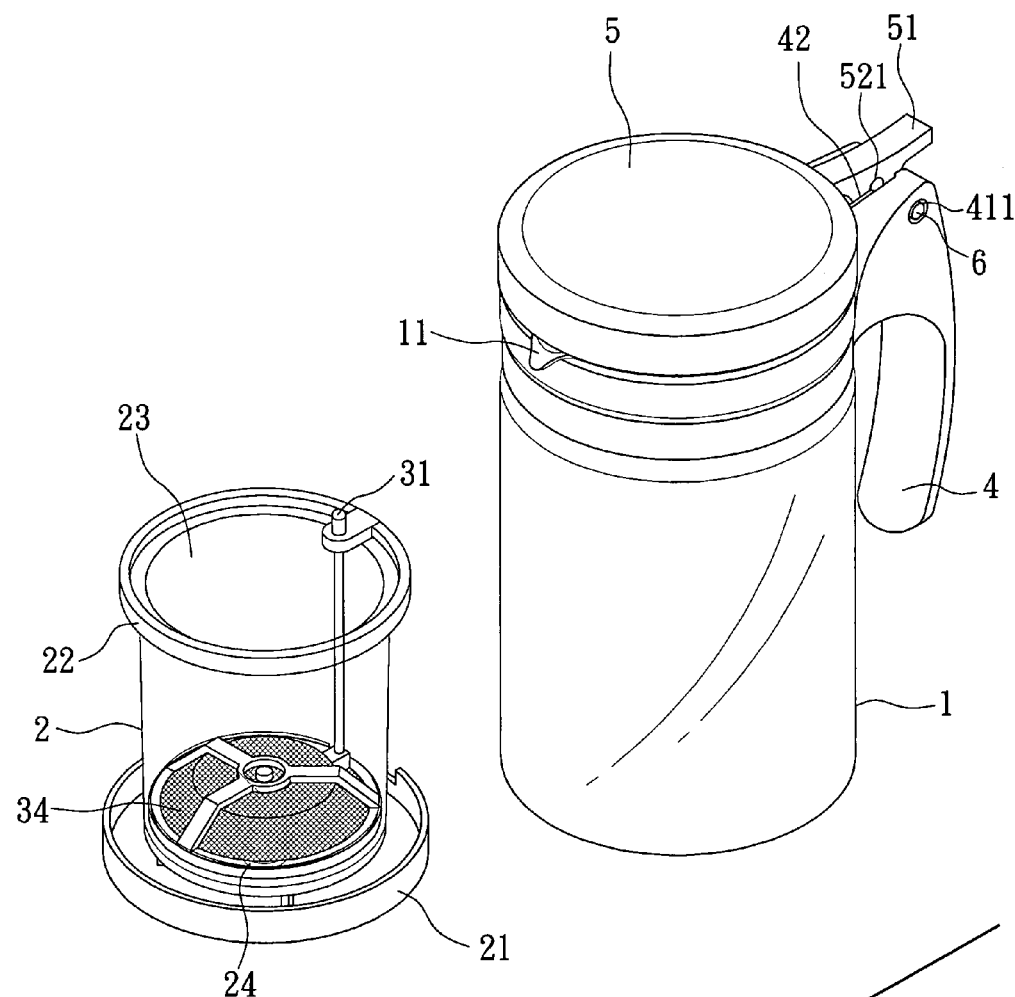
FIG. 2 shows that the inner cup is removed from the outer cup and the first cover closes the open top of the outer cup.
Figure 5:
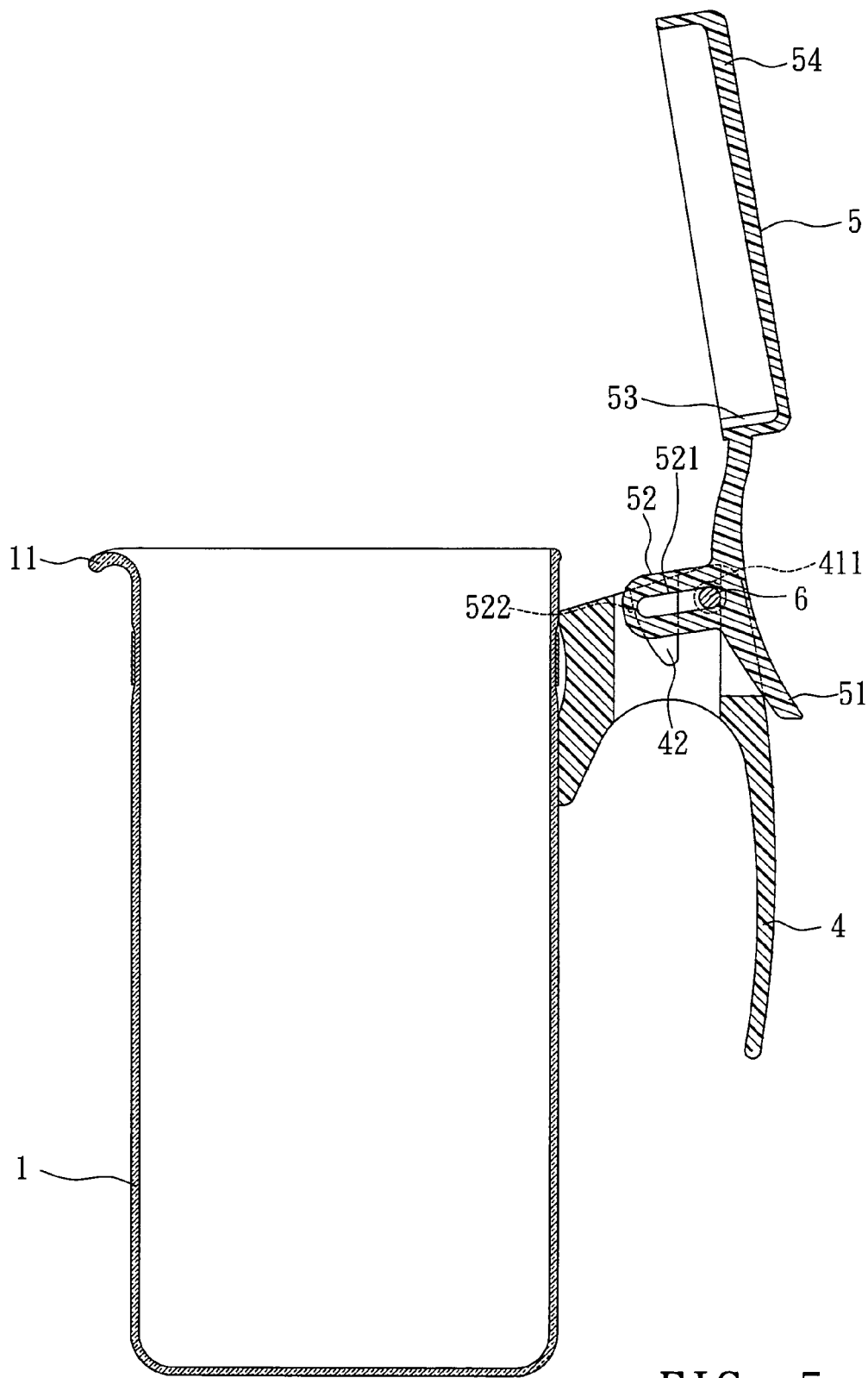
FIG. 5 is a cross sectional view to show that the first cover on the outer cup is at opened position.

As shown in FIG. 2, the second cover 21 can be put up-side-down and used as a cup pad on which the inner cup 2 is put. Referring to FIG. 5, the beverage is in the outer cup 1 and the first cover 5 can be opened by pushing the operation portion 51 downward, the pivotal portion 52 is pivoted about the pin 6 and the bosses 522 move along the curved grooves 42 until the operation portion 51 is stopped by the handle 4 as shown in FIG. 5.

When releasing the operation portion 51, the thicken portion 54 of the first cover 5 pivots the first cover 5 to cover the outer cup 1 due to gravity so that the bosses 522 move back along the curved grooves 42 and the first cover 5 is pivoted from the opened position to the closed position.

Figure 7:
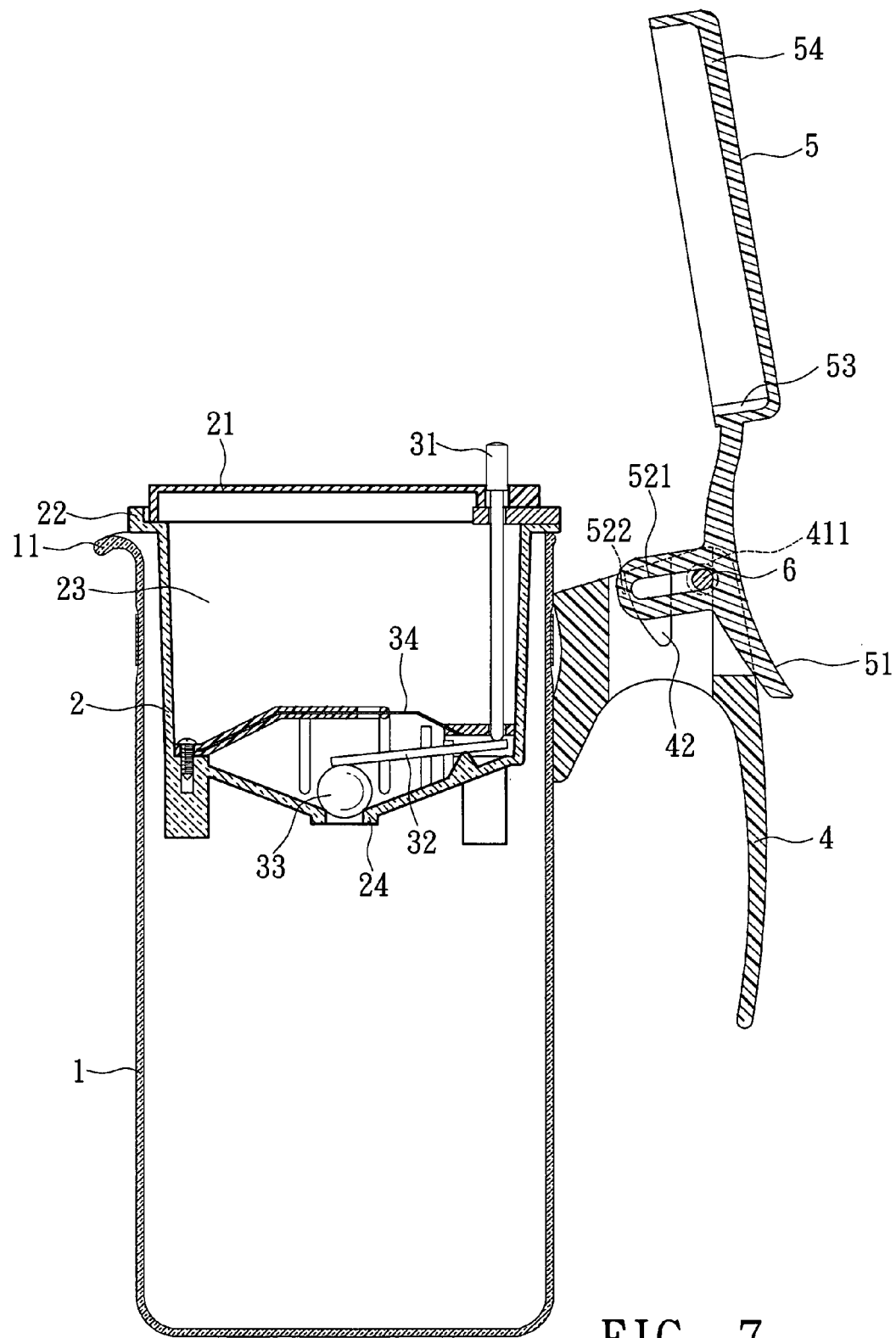
FIG. 7 is a cross sectional view to show that the first cover is at opened position while the inner cup is received in the outer cup.

FIGS. 6 and 7 show the first cover 5 is operated while the inner cup 2 is received in the outer cup 1, the guide protrusion 53 will touch the open top end of the inner cup 2 when the first cover 5 is pivoted downward. By the touch of the guide protrusion 53 and the open top end of the inner cup 2, the first cover 5 is ensured and guided to cover the outer cup 1 as desired.

While we have shown and described the embodiment in accordance with the present invention, it should be clear to those skilled in the art that further embodiments may be made without departing from the scope of the present invention.

What is claimed is:

1. A beverage maker assembly comprising:
   an outer cup having a handle connected to an outside thereof and an inner cup removably received in the outer cup and rested on a top periphery of an open end of the outer cup, a filtering unit received in the inner cup and being in communication between the inner cup and the outer cup, a first cover pivotably connected to the handle and mounted to the outer cup and a second cover removably mounted to an open top end of the inner cup, characterized in that:
   the handle includes a recess which defines two lugs and a passage is defined through the two lugs between which the recess is defined, the first cover has an operation portion extending radially from a periphery thereof and a pivotal portion extends from the operation portion, the pivotal portion has an elongate hole and is received in the recess, a pin extends through the passage and the elongate hole to pivotably connect the first cover to the handle;
   wherein two curved grooves are defined in two respective insides of the two lugs of the handle and the first cover includes two bosses extending from the pivotal portion, the bosses are slidably engaged with the curved grooves.

2. The assembly as claimed in claim 1, wherein the first cover has a guide protrusion located at an inside of a peripheral wall thereof and the guide protrusion is located close to the pivotal portion.

3. The assembly as claimed in claim 2, wherein the first cover includes a thickened portion located at a position opposite to the guide protrusion.

* * * * *